US005104467A

United States Patent [19]

Johnson

[11] Patent Number: 5,104,467

[45] Date of Patent: Apr. 14, 1992

[54] METHOD OF CONSTRUCTING ARTIFICIAL PLANTS HAVING A NATURAL APPEARANCE

[76] Inventor: Alfred E. Johnson, 1145 N. Main, Orem, Utah 84057

[21] Appl. No.: 525,505

[22] Filed: May 18, 1990

[51] Int. Cl.[5] ........................ B29C 65/48; A41G 1/00

[52] U.S. Cl. .................................. 156/61; 156/304.5; 428/18; 428/22

[58] Field of Search ...................... 156/61, 293, 304.5, 156/304.6, 303.1; 211/196, 205; 428/18, 21, 22, 19

[56] References Cited

U.S. PATENT DOCUMENTS

| | | | |
|---|---|---|---|
| 1,577,873 | 3/1926 | Root | 428/18 X |
| 2,186,351 | 1/1940 | Stojaneck | 428/7 |
| 3,157,558 | 11/1964 | Adler | 428/18 |
| 3,514,358 | 5/1970 | Monaghan et al. | 156/61 |
| 3,525,659 | 8/1970 | Ebihara | 428/18 |
| 4,364,102 | 12/1982 | Huppert et al. | 428/18 X |

FOREIGN PATENT DOCUMENTS

| | | | |
|---|---|---|---|
| 1136747 | 5/1957 | France | 428/18 |

*Primary Examiner*—Michael W. Ball
*Assistant Examiner*—Jeff H. Aftergut
*Attorney, Agent, or Firm*—Lynn G. Foster

[57] ABSTRACT

A novel mechanism and related processes for joining naturally grown and artificially produced parts to create aesthetically appealing, naturally appearing, large artificial plants, such as trees. A novel joint mechanism provides the appearance of naturally occurring outgrowth of branches and the like from proximally disposed trunks and stems. A method for bending and forming artificial foliage provides a more airy, naturally appearing leaf pattern around the crown of a plant.

6 Claims, 2 Drawing Sheets

METHOD OF CONSTRUCTING ARTIFICIAL PLANTS HAVING A NATURAL APPEARANCE

FIELD OF INVENTION

This invention relates to constructing artificial plants and more specifically to processes and related mechanisms for joining naturally grown and artificially produced parts to create aesthetically appealing, naturally appearing, large artificial plants, such as trees.

BACKGROUND AND RELATED ART

It has become common practice to use artificially produced foliage to construct large, artificial decorative plants, especially trees. Artificially produced foliage parts from which complete artificial plants are constructed are widely available. Each such artificial foliage provides a naturally appearing plant segment emulation, comprising stems, bifurcations, and leafy extremities, and is generally used in the crown structure of artificial plants. Artificially produced foliage is typically affixed to lower trunks and leafless branches in the production of artificial trees and bushes. The lower trunks and leafless branches are most often constructed from naturally grown woody materials.

Naturally grown trunks and branches are ordinarily selected to be of sufficient girth to support the combined weight of higher structures. Typically the stem of artificial foliage is significantly smaller in diameter than a graft receiving trunk or branch. For this reason, each joint, especially a butt-end joint, usually embodies an unnaturally appearing discontinuity where a smaller, secondary structure is affixed to a larger, basal structure. Further the artificially produced foliage usually comprises an untapered lower stem which detracts from a viewers image of a naturally grown plant. Past attempts to hide the unnatural appearance of the combination of untapered stems and joint discontinuities have often resulted in the construction of artificial bushes and trees packed with an overabundance of artificial leaf foliage to camouflage the inner joints and limb structure. Such plants appear unnatural, as a natural tree or bush with such tightly packed limbs and leaves does not pass sufficient light to the inner leaves to support growth. A further frequent endeavor attempting to camouflaging joint discontinuities by adding a wreath of moss or the like around each visible conjoining structure has also proved to be of limited aesthetic merit.

BRIEF SUMMARY AND OBJECTS OF THE INVENTION

In brief summary, this novel invention comprises a construction system, and related methods, for producing naturally appearing, aesthetically pleasing, artificial plants whereby discontinuities in conjoining parts are hidden by naturally appearing tapered extensions from the site of each graft along the stem of the protruding part. Such extensions appear as natural organic outgrowth of the plant, and limb structures of artificially produced leaf bearing limbs are reformed to provide a realistic, airy configuration of leaves which emulates a healthy leaft pattern.

Accordingly, it is a primary object to provide a construction joint for joining artificial plant parts which emulates naturally appearing outgrowth from the basal part to the secondary part.

It is a further primary object to provide a conjoining system and related methods for constructing an aesthetically appealing, naturally appearing artificial plant, such as a bush or tree.

It is a principal object to provide a process for bending and otherwise varying the structure of man-made foliage to produce a more lifelike leaf pattern.

It is main object to provide material and processes for making and forming a construction joint which provides the visual appearance of natural continuity across grafting and bonding sites in the artificial plant.

These and other objects and features of the present invention will be apparent from the detailed description taken with reference to accompanying drawings.

DETAILED DESCRIPTION OF THE ILLUSTRATED EMBODIMENTS

Figure 1:
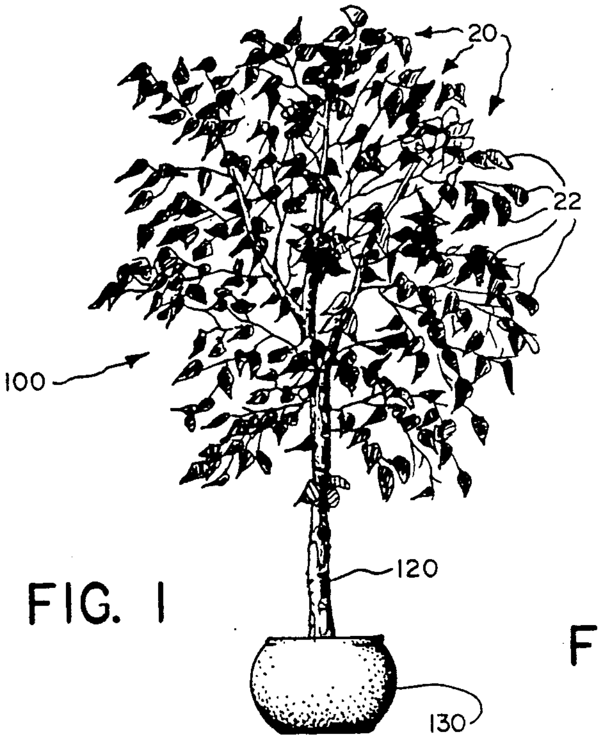
FIG. 1 is perspective drawing of a completely constructed artificial tree.
Figure 5:
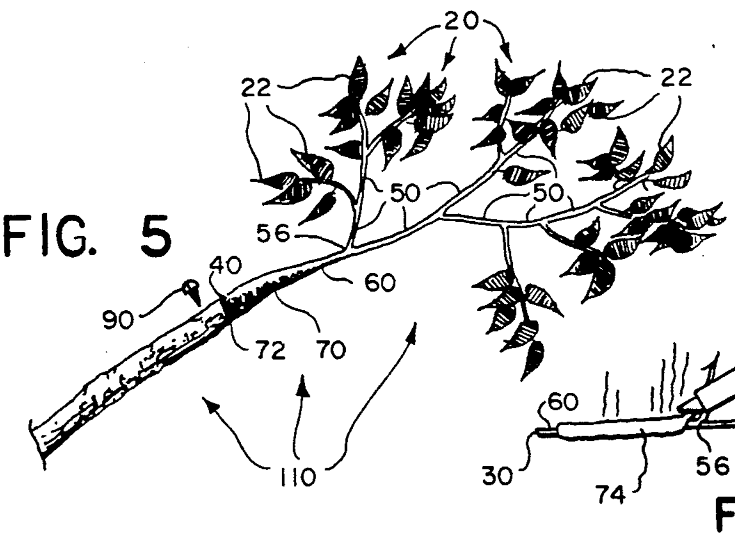
FIG. 5 is a perspective drawing showing the parts of FIG. 4 conjoined.
Figure 6:
FIG. 6 is a perspective drawing of an example of man-made foliage as received from a manufacturer.

In this description, the term proximal is used to indicate a segment of a plant nearer the main stem or trunk. The term distal refers to a segment of the plant away from the main stem or trunk. Reference is now made to the embodiments illustrated in FIGS. 1-8 wherein like numerals are used to designate like parts throughout. While the invention is embodied in all plant structures including bushes, the currently preferred embodiment is described as used in the construction of an artificial tree. A completed tree 100 is seen in FIG. 1, comprising a main stem or trunk 120 and a crown leaves 22 formed by a plurality of limbs of artificial foliage 20. A single limb of artificial foliage 20 is seen in FIG. 6. Such artificial foliage 20 is widely available in the art.

Prior to constructing a tree 100, a stabilizing foundation is provided by firmly affixing nails or other lower support members disposed laterally or perpendicularly to the basal segment of the trunk 120 and covering and securing them in a weight providing, supporting base of plaster of paris, or the like, usually formed in the bottom of a basket or pot 130. In this manner, the trunk 120 is set and held in a vertical disposition through construction and use. In the preferred embodiment, the trunk 120 is a selected trunk or limb of a naturally grown tree, however, other materials may be used comprising, extrusions or castings of metal, concrete, or resinous synthetic material within the scope of the invention. In those cases where the appearance of the trunk surface does not appropriately emulate a tree trunk, a covering, similar to a joint covering placed at the union of conjoinable artificial parts, is used as a camouflaging cover. The joint covering is a key element of the invention and is described in detail later. Mold forming baskets 130 are available from many sources and may vary widely in size and form within the scope if the invention. Such baskets 130 are most often selected to meet the standards of decor rather than to meet plant construction requirements and will, therefore not be discussed further. Leafless branches, providing secondary support distal to the trunk, are characteristically made from material which is similar, but smaller in diameter, to that selected for the trunk, though other supporting materials, as mentioned above, may be used.

Figure 2:
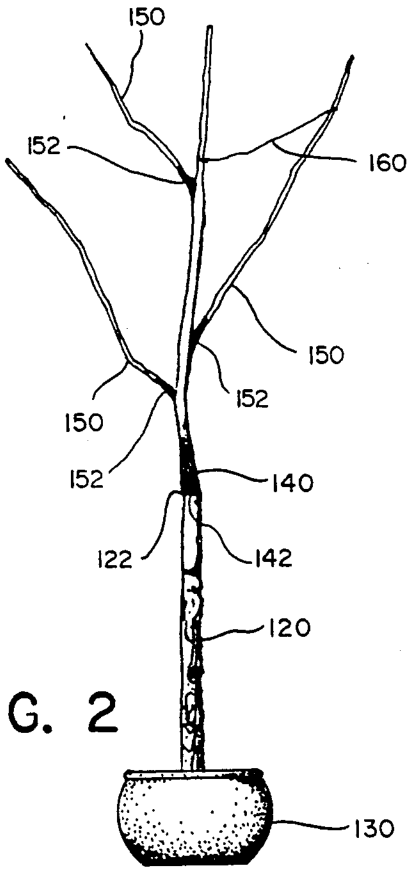
FIG. 2 is a perspective drawing showing the trunk and leafless branches of a partially constructed tree.

Generally, the trunk and leafless branches are assembled first. As seen in FIG. 2, the larger trunk 120 extends upward from pot 130 to a higher level where trunk top 122 is grafted and bonded to the bottom 142 of a main stem 140. At predetermined forked region grafting locations 152 where lateral branching is added, leafless branches 150 are grafted and bonded either to the centrally disposed trunk 120 or to the main stem 140. Grafting and bonding is customarily accomplished by drilling a receiving hole or aperture of essentially the same diameter as the protruding branch or stem to be inserted to consummate the graft. The hole is drilled as deeply as possible into the supporting trunk, stem, or branch. If the graft is directed into the side of a trunk, stem, or branch, rather than into a butt-end, care is taken to assure that at least one-half of the supporting stem material remains around the bore hole. If the grafting and bonding joint between a supporting structure and a protruding branch does not provide adequate support for the protruding branch, a brace 160 is affixed between a superior position on the protruding branch 150 to the supporting main stem 140, as shown in FIG. 2, or to another protruding branch 150. Each support brace 160 comprises a wire, cord, rod, or other stress bearing material which is firmly bound or bonded to the protruding branch 150 on one end and to the supporting member on the other end.

Figure 3:
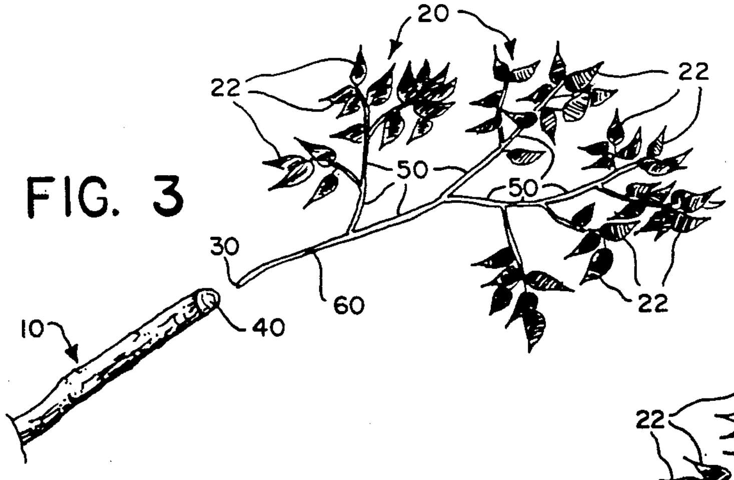
FIG. 3 is a perspective drawing of two parts of an artificial plant before being joined.
Figure 4:
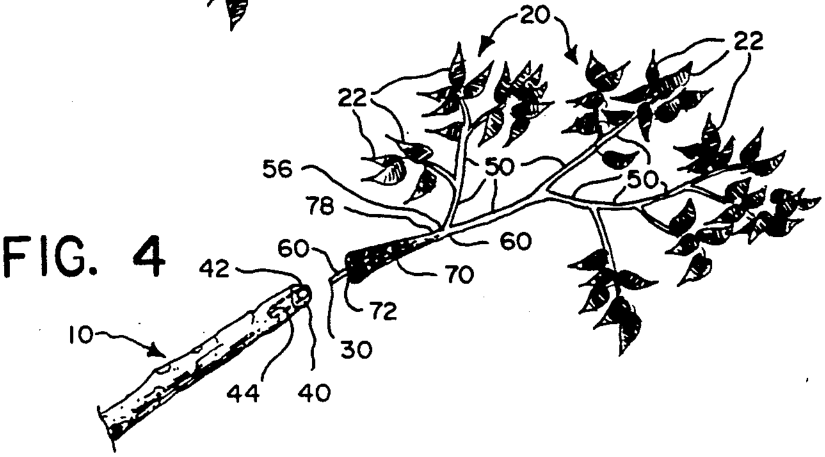
FIG. 4 is a perspective drawing of leafless and foliage parts of FIG. 3 wherein each has been modified in preparation for grafting and bonding.

Before making each graft or bond, tapering material is added to each protruding branch to provide a more naturally appearing joint at the bifurcation from or union with the supporting structure. The manner of adding a tapering extension to the protruding branch is seen in FIGS. 3–5. The connection illustrated is a butt-end junction, but the invention applies to sidewise junctions as shown in FIG. 2, as well.

As shown in FIG. 3, the two joining members normally comprise a larger supporting branch or trunk, seen as leafless limb 10, and a smaller protruding member, seen in this example as artificial foliage 20. As mentioned earlier; leafless limb 10 may be selected from naturally grown woody stock or artificially produced concrete, metal, or synthetic resinous material. Typically, as shown in FIG. 3, leafless limb 10 is substantially larger than the main stem 60 of foliage 20. Leafless limb 10 is shown to further comprise a butt-end 40. Foliage 20 comprises a plurality of leaves 22, interbifurcation leaf free stem segments 50, a main stem 60, and a main stem end segment 30. Other conjoining parts comprising trunks and leafless limbs, a larger and a smaller leafless limb, and a supporting part and multiple protruding parts all of which may be used and so-joined or grafted within the scope of this invention. As well, the basal or supporting part may also be grafted by side entry, in addition to a butt-end graft, within the scope of this invention.

Figure 4A:
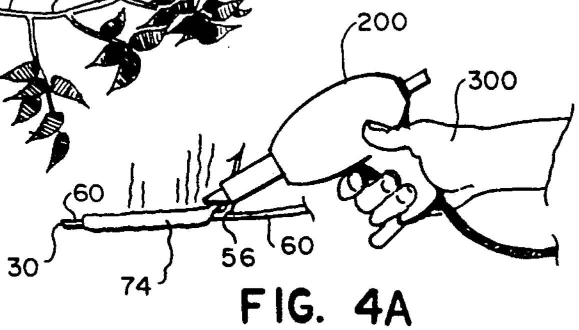
FIG. 4A is a perspective drawing showing application of adhesive to the stem of a part, such as the stem of the artificial foliage of FIG. 4.
Figure 4B:
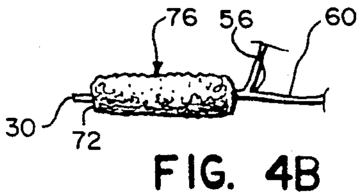
FIG. 4B is a perspective drawing showing the stem of the part shown in FIG. 4A further covered before forming a taper.
Figure 4C:
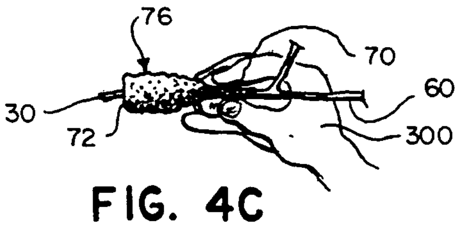
FIG. 4C is a perspective drawing showing the covered stem of FIG. 4B in the process of being hand shaped to form a tapered surface.

A tapered segment 70, added to main stem 60 of artificial foliage 20, is seen in FIG. 4. A tapered segment 70 is constructed to provide an essentially conically tapered form from a proximal end 72 to a distal apical junction 78 where the surface of tapered segment 70 is essentially continuous with main stem 60. Formation of the tapered segment is best seen in FIGS. 4A–D. To add tapered segment 70 to main stem 60 a layer of adhesive 74, such as hot glue from glue gun 200, is distributed along the segment of main stem 60 which comprises substantially the entire length of tapered segment 70 as seen in FIGS. 4A–C.

The length of tapered segment 70 is determined by the difference in length of the free proximal main stem end segment 30 reserved for the male graft insertion length and the length of main stem 60 from the proximal end of segment 30 to the first bifurcation 56. The length of main stem end segment 30 is further determined by the type of graft employed and the depth available in the graft hole. If the graft is into a butt-end as seen in FIGS. 3–5, the hole depth is typically longer than in a side entry graft as seen in FIG. 2. In either case, a hole of greatest possible depth is provided in the supporting structure, and the length of main stem end segment 30 is measured and determined to be the length of the hole depth.

As the adhesive 74 is applied, main stem 60 is axially rotated to provide a uniform coating. Previously prepared surface emulating material 76, such as shredded sphagnum (peat), is distributed across the entire surface of the applied adhesive 74 as seen in FIG. 4B. While the adhesive 74 remains formable, a taper 70 is manually formed as seen in FIG. 4C. When using a thermal setting adhesive such as hot glue, care must be taken to prevent burns to the hand 300 of the builder. To prevent such burns, it is recommended that the hand 300 be properly gloved or, as an alternative, kept wet by dipping the hand 300 into cold water before each contact with the adhesive 74 and surface emulating material 76.

To form the taper, the apical, distal portion of the cone is first formed by compressing the surface material into the adhesive and toward the proximal end of stem end segment 30, causing the girth of the taper to increase proximally. The compressing, proximally forcing process continues until a tapered segment 70 as seen in FIGS. 4–5 is completed. If the girth of the tapered segment 70 is too large, excess material is removed at the stem end segment 30. If the girth of the tapered segment 70 is too small, a subsequent layer of adhesive 74 and surface emulating material 76 is added and the compressing, taper producing procedure is repeated. When the girth of the proximal end 72 of tapered segment 70 is a size which provides the appearance of a natural outgrowth from the supporting member to which it is to be grafted, the stem 60 and associated tapered segment is set aside until safely handleable. Other processes for producing a tapered segment, comprising molding, automatic forming, wrapping, and casting are within the scope of the invention. As well, the scope of this invention comprises use of other surface emulating materials comprising synthetic resinous materials, prepared organic materials, and adhesible inorganic materials.

Figure 7:
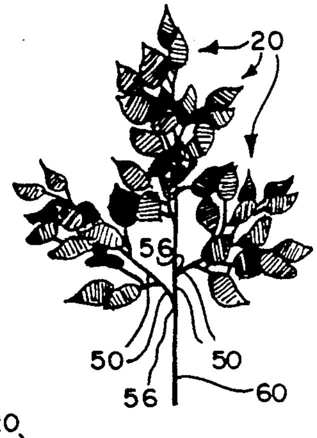
FIG. 7 is a perspective drawing of the foliage shown in FIG. 6 with protruding limbs bent outward.
Figure 8:
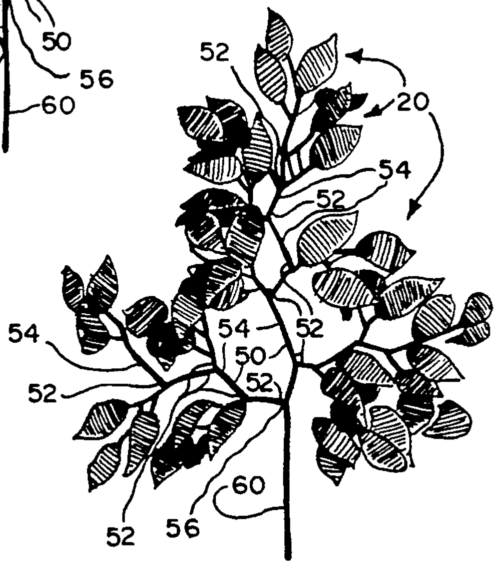
FIG. 8 is a perspective drawing of the foliage shown in FIG. 6 with selected limbs bent in a zigzag pattern.

Before grafting leaf bearing foliage to a supporting stem, the structure of the artificial foliage 20 is reformed to provide a more natural and aesthetically appealing appearance. Typically, foliage is delivered from a manufacturer disposed in a substantially closed format as seen in FIG. 6. Each artificial foliage 20 comprises leaves 22, a main stem 60, and, generally, leafless stem segments 50, which are interposed between leaf and other stem bifurcations. Branches protrude from main stem 60 at main stem bifurcations 56. As best seen in FIG. 7, the artificial foliage 20 is partially opened by bending the stems 50 at each bifurcation 56 away from main stem 60. Once the foliage 20 is so opened, a novel and more extensive bending process, involving bending leafless stem segments 50, provides a more natural and aesthetically appealing appearance of artificial foliage 20. At least two successive leafless stem segments 50 are bent at each proximal bifurcation to form a bend 52 and distal straight segment 54. Each stem segment 50 is bent such that the path of successive straight segments 54 comprises a zigzag pattern as seen in FIG. 8 which is drawn to a larger scale for clarity. The open leaf pattern and more airy appearance is easily seen when comparing the foliage 20 of FIGS. 6 and 7 to the foliage 20 of FIG. 8.

Referring once more to FIG. 4, an artificial foliage 20, having been previously prepared by adding a taper 70 is seen ready for grafting. For butt-end grafting, a hole is drilled as deeply as structure curvature and drill length allows, usually in excess of one inch. For side entry grafting, the hole is determined by the angle of entry and diameter of the supporting segment. In this latter case, the hole is drilled as deeply as possible consistent with paring out no more than one half of the local supporting structure in the vicinity of the hole.

As seen in FIG. 4, an aperture 42 is drilled into butt-end 40 to a depth 44 as specified above, providing an aperture 42 with a diameter substantially the same as stem end segment 30. An appropriate adhesive is added to stem end segment 30 and into aperture 42. Segment 30 is fully inserted into aperture 42, and a grafted and bonded joint is made as shown in FIG. 5, providing a joined artificial plant part 110. If necessary to increase the strength of the joint, a strengthening pin, such as screw 90, is implanted into limb 10 such that it intersects aperture 42 and stem end 30. As necessary to produce an aesthetically appealing joint a covering layer of adhesive such as hot glue 74 and surface material 76 such as shredded sphagnum is applied to extend coverage over joint and exposed ends of strengthening pins. When a brace 160 comprises wire or other unnaturally appearing material, a layer of adhesive and surface material is used as a partial or complete camouflaging cover.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for producing at least one of naturally appearing forked and butt-end graft regions of an artificial plant comprising the steps of:

removing a segment from a natural tree for use as a trunk of the artificial tree;

providing a limb portion of the artificial tree;

providing a joint material which is first pliant and later, after curing, being substantially non-pliant;

preparing complimentary grafting and bonding sites at a predetermined location on the trunk segment and at an end of the limb portion;

causing the grafting and bonding sites to become contiguous;

adhesively applying the joint material directly around the contiguous sites;

shaping the joint material to sculpture a structural and visual natural taper at and adjacent the contiguous sites which extends distally from the grafting and bonding sites and reduces progressively in girth in a distal direction until smoothly merging with the limb portion.

2. A process for constructing a naturally appearing artificial plant comprising the following steps:

providing at least one construction joint comprising the following steps:

providing a conjoining supporting part which is derived from a naturally grown plant and which provides support for the joint;

providing a conjoining branching part derived from a naturally grown plant or from synthetically made parts, the conjoining branching part being smaller in diameter than the conjoining supporting part and comprising at least one stem means which further comprises foliage attached thereto to be used as the conjoining branching part in at least one construction joint which is part of a crown of the plant;

providing formable means for preparing a taper about the conjoining branching part which are pliant when applied and shaped and change to a non-pliant solid thereafter;

preparing a complementary grafting and bonding site in each conjoining supporting part and each conjoining branching part of the artificial plant;

adhesively applying the formable means directly around the conjoining branching part near the associated grafting and bonding site;

shaping the formable means, preparing a naturally appearing taper which extends distally from the grafting and bonding site and reduces in girth essentially to a diametral dimension of the smaller diameter conjoining part;

grafting and bonding the conjoining parts;

extending each taper to cover imperfections in the joint;

successively repeating the at least one construction joint providing step to completely construct the artificial plant.

3. A process according to claim 2 comprising the following further step:

in the at least one stem means, providing extended stem means comprising at least two consecutive leaf free stems and foliage on a branch, bending the at least two consecutive leaf free stems in the extended stem means in a zigzag fashion to provide a non-linear stem pathway whereby a random and airy pattern of foliage is provided.

4. A process for constructing a naturally appearing artificial plant comprising the following steps:

providing at least one construction joint comprising the following steps:

providing a conjoining supporting part which is derived from a naturally grown plant and which provides support for the joint;

providing a conjoining branching part derived from at least one of naturally grown and synthetically made parts, the conjoining branching part being smaller in diameter than the conjoining supporting part;

providing at least one stem means comprising a branch further comprising foliage and at least two leaf free stem segments of the branch, the stem means used as a conjoining branching part in at least one construction joint;

providing formable means for preparing a taper about the conjoining branching part;

preparing a complementary grafting and bonding site in each conjoining supporting part and each conjoining branching part of the artificial plant;

adhesively applying the formable means directly around the conjoining branching part near the joint;

bending the at least two consecutive leaf free stem segments of the stem means in a zigzag fashion to provide a non-linear stem pathway whereby a random and airy pattern of foliage is provided.

shaping the formable means, preparing a naturally appearing taper, for each smaller diameter conjoining part, which extends distally from each grafting and bonding site at the conjoining supporting part and reduces in girth essentially to the diameter of each smaller diameter conjoining part;

grafting and bonding the conjoining parts;

extending each taper to cover imperfections in appearance in the joint;

successively repeating the at least one construction joint providing step to completely construct the artificial plant.

5. A process according to claim 4 wherein preparing formable means comprise shredding organic material.

6. A process according to claim 5 wherein preparing formable means comprise shredding dried sphagnum.

* * * * *